Patented Feb. 20, 1934

1,948,342

UNITED STATES PATENT OFFICE

1,948,342

MANUFACTURE OF BENZOIC ANHYDRIDE

Michael N. Dvornikoff, St. Louis, Mo., assignor, by mesne assignments, to Monsanto Chemical Company, a corporation of Delaware No Drawing. Application October 14, 1931
Serial No. 568,871

7 Claims. (Cl. 260—123)

This invention relates to the manufacture of benzoic anhydride.

The principal object of this invention is to provide a simple, inexpensive and convenient method of preparing benzoic anhydride, which avoids by-product formation and which at the same time enables one to obtain practically quantitative yields when practicing the invention either on a small laboratory scale or with equal facility on a commercial scale.

Various methods have been proposed heretofore to manufacture anhydrides of organic acids. Thus acetic anhydride may be made by subjecting the vapors of acetic acid to temperatures of 300°–500° C. and subsequently separating the anhydride from the unreacted acid, as well as water, which is formed, by fractional condensation or other methods. While the process is effective in manufacturing large quantities of anhydride, the reaction is not quantitative, and accordingly necessitates an extensive recovery system in order to be effective. It has likewise been proposed to manufacture benzoic anhydride by heating at 180° C. equimolar quantities of benzoic acid and benzoyl chloride (Liebig's "Annalen der Chemie" Vol. 226, p. 5) whereby a yield of approximately 50% of the theoretical is obtainable. It has also been proposed to manufacture benzoic anhydride by reacting benzoyl chloride with steam (D. R. P. 520, 153); as well as by reacting a salt of an organic acid with the acid chloride of said organic acid.

According to the present invention, substantially quantitative yields of the anhydride may be obtained by heating, in liquid phase, equal molecular quantities of the acid and acid chloride if the reaction is effected at elevated temperatures and preferably under reduced pressure conditions. The removal of the gaseous hydrogen chloride may be facilitated by introducing a jet of dry air or other inert vapor into the reaction mixture. The degree of vacuum and temperature as well as other conditions of operation may be varied within wide limits without affecting materially the yields. In general, the higher the temperature of the reactants, the lower the degree of vacuum required.

One method of applying the principles of the present invention consists in admixing equal molar quantities of benzoic acid and benzoyl chloride (a small excess of the acid chloride may be employed advantageously) in a glass or enamel or other suitable reaction vessel which is provided with heating means and is adapted to be operated at reduced pressures. Heat is applied slowly to the reaction mixture for a period of 1–2 hours until the temperature has reached approximately 210°–230° C. where it is maintained for an additional period of approximately 2 hours. The pressure within the reaction vessel is then reduced an amount approximately equivalent to 5 inches of mercury, and thereafter gradually reduced an additional amount approximately equivalent to 15–20 inches of mercury.

The reaction is facilitated by agitating the charge, or by bubbling dry air through the liquid mixture. After approximately 6 hours at the reduced pressure and elevated temperature, the reaction will be found to be substantially complete, and the anhydride product residue may be purified conveniently by distillation in vacuo. In this connection, it has been observed that by raising the temperature of the reaction mixture gradually as the reaction proceeds to approximately 280°–340° C. substantially quantitative yields of the anhydride are obtainable without reducing the pressure. A stream of inert gas may be bubbled through the charge advantageously thereby facilitating the elimination of the hydrogen chloride.

It is evident that the application of vacuum of greater or less degree may be employed, and that its application may extend over the entire period of the reaction. It is likewise apparent that the use of a stream of dry inert vapor to facilitate the reaction may be omitted, and that higher reaction temperatures or a longer period of reaction may be resorted to, to effect completion of the reaction. One may prepare other anhydrides by the same process; thus, for example, one may react chlorbenzoyl chloride with chlorbenzoic acid to form chlorbenzoic anhydride.

From the foregoing description, it will be apparent that I have provided a method of manufacturing acid anhydrides whereby one is enabled to obtain substantially quantitative yields of the acid anhydride without the formation of by-products. Moreover, the product obtained is of a high degree of purity which is readily marketable without extensive purification or refining treatment. Although there has been described but a single specific embodiment of the invention and numerable changes to the procedure have been indicated, it will be apparent that the invention is not so limited, but may be extended to other embodiments without departing from the broad principles thereof, which contemplate reacting an acid with an acid chloride under reduced pressure conditions or at atmospheric pressure and at temperatures approximating 300° C., and preferably in each case with agitation or the aid of a stream of inert gas.

What I claim is:

1. A process of preparing benzoic anhydride which comprises reacting benzoic acid with benzoyl chloride at subatmospheric pressures.

2. A process of preparing benzoic anhydride which comprises reacting benzoic acid with benzoyl chloride at subatmospheric pressures while agitating the mixture.

3. A process of preparing benzoic anhydride which comprises reacting benzoic acid with benzoyl chloride at subatmospheric pressures and with the aid of a stream of inert gas which is passed through the reaction mixture.

4. A process of preparing benzoic anhydride which comprises reacting benzoic acid with benzoyl chloride at subatmospheric pressures while agitating the mixture and passing a stream of inert gas therethrough.

5. A process of preparing benzoic anhydride which comprises reacting substantially equal molar proportions of benzoic acid and benzoyl chloride between approximately 210° C. and approximately 230° C. and under a vacuum represented by approximately 20 inches of mercury, while agitating the mixture and passing a stream of inert gas therethrough.

6. A process of preparing a monocarboxylic acid anhydride of benzene which comprises reacting a monocarboxylic acid of benzene with the corresponding acid chloride at sub-atmospheric pressures.

7. A method of manufacturing benzoic anhydride which comprises causing benzoyl chloride and benzoic acid in substantially equal molar quantities to react, the temperature during the latter stages of the reaction being between approximately 280° C. and approximately 340° C.

MICHAEL N. DVORNIKOFF.